United States Patent [19]

Herring, Jr.

[11] 4,260,103
[45] Apr. 7, 1981

[54] HEATING SYSTEM FOR A RAILWAY CAR FOR UTILIZING WASTE HEAT FROM AN ENGINE

[75] Inventor: James M. Herring, Jr., Merion Station, Pa.

[73] Assignee: The Budd Company, Troy, Mich.

[21] Appl. No.: 4,072

[22] Filed: Jan. 17, 1979

[51] Int. Cl.³ .............................................. B60H 1/00
[52] U.S. Cl. ........................................ 237/5; 237/8 C; 237/8 R; 237/12.3 B; 237/34; 165/35
[58] Field of Search ................. 237/8 C, 12.3 B, 8 R, 237/39, 12.4, 34, 35, 42, 41, 28, 5, 61; 165/47, 36, 37, 38

[56] References Cited

U.S. PATENT DOCUMENTS

| | | | |
|---|---|---|---|
| 1,708,140 | 4/1929 | Josephs | 237/12.3 B |
| 1,991,990 | 2/1935 | Van Vulpen et al. | 237/8 R X |
| 2,038,193 | 4/1936 | Parsons | 237/12.3 B |
| 2,564,344 | 8/1951 | Russell et al. | 237/39 |
| 2,790,605 | 4/1957 | Peterson et al. | 237/12.3 B |

FOREIGN PATENT DOCUMENTS

| | | | |
|---|---|---|---|
| 574950 | 12/1923 | France | 237/12.4 |
| 1254195 | 12/1960 | France | 237/8 C |
| 63183 | 4/1925 | Sweden | 237/28 |

Primary Examiner—Henry C. Yuen
Assistant Examiner—Henry Bennett
Attorney, Agent, or Firm—A. L. Trueax, Jr.

[57] ABSTRACT

A water cooling loop is connected to cool an engine of a railway car or the like and includes a heat exchanger. A system for heating a compartment includes a pump for pumping water to heating elements. The water from the pump is selectively pumped through a first path which includes the heat exchanger or through a second path which by-passes the heat exchanger dependent upon the temperature condition inside the car.

3 Claims, 1 Drawing Figure

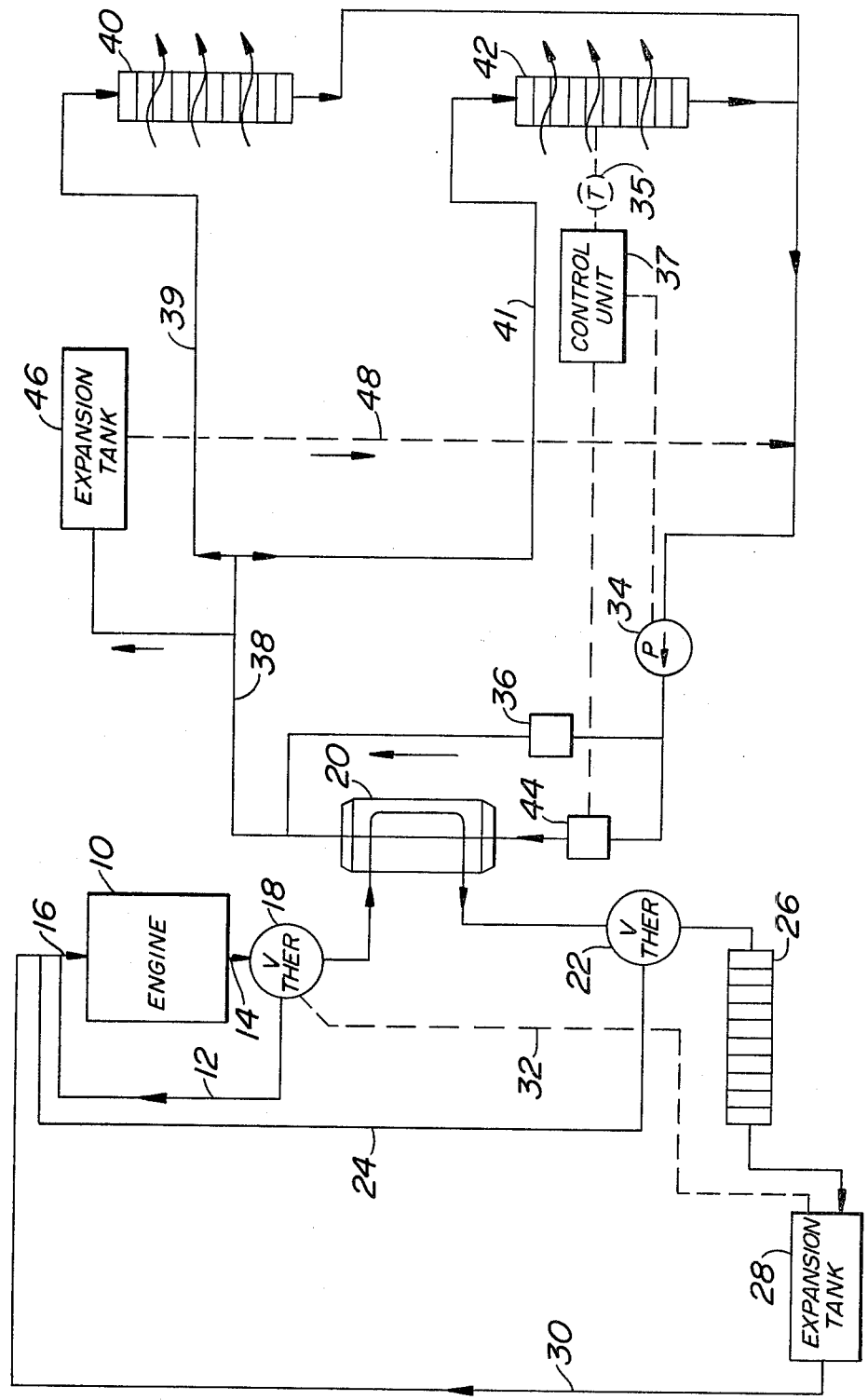

HEATING SYSTEM FOR A RAILWAY CAR FOR UTILIZING WASTE HEAT FROM AN ENGINE

BACKGROUND OF THE INVENTION

It is well known to provide water cooling for engines in railway cars. In some cases, the heat generated by the engine has been used for other purposes.

Because of the varying heating requirements of a railway car due to the wide variations of temperature conditions under which is operates, it is difficult to utilize the waste heat from an engine directly and continuously to provide conventional heating for the car. The reason for this is that there are times, during warm or mild temperature conditions, when little or no heat is required and other times, as during the winter months, when the heating requirements are high.

SUMMARY OF THE INVENTION

It is an object of this invention to provide a heating system in a railway car which selectively utilizes the waste heat from an engine in the heating system of the car.

In accordance with the present invention, a water circulating loop including a heat exchanger is used to provide cooling for an engine in a railway car. The heating system for providing heat for a compartment, which may be a railway car includes heating elements heated by hot water. A pump circulates the water through the heating elements through either a first or second parallel path. The heat exchanger included in the engine cooling system is connected in the first parallel path so that water circulated therethrough by the pump receives heat therefrom. The second path through which the pump circulates water by-passes the heat exchanger. Temperature responsive means selectively switch the water from said pump to either the first or second path.

Other objects and advantages of the present invention will be apparent and suggest themselves to those skilled in the art, from a reading of the following specification and claims, taken in conjunction with the sole FIGURE of the drawing which schematically illustrates a heating system in a railway car, in accordance with the present invention.

BRIEF DESCRIPTION OF THE DRAWING

The sole drawing is a schematic diagram of the heating system in accordance with the principles of the present invention.

DESCRIPTION OF THE PREFERRED EMBODIMENT

Referring to the sole FIGURE of the drawing, an engine 10 is used in the railway car (not illustrated). Heat is generated by the engine and the engine is cooled by a water cooling system. When the engine is first started, water is circulated for a short period of time in a warm up loop connected between the outlet 14 and the inlet 16 of the engine. This warm up loop comprises a thermostat valve 18 capable of steering the water in one of two paths. When the temperature is below 170° F., for example, the thermostat 18 causes the water to pass through the warm up loop which includes a line 12. When the temperature reaches 170°, the thermostat 18 blocks the water in the warm up loop and directs it into a second loop or circulating path.

After the water in the warm up loop reaches 170° F., the water flows through the second loop, which includes a heat exchanger 20. The water passes from the heat exchanger 20 to another thermostat 22. The thermostat valve 22 is also capable of directing the water to one or another path dependent upon its operating state as determined by temperature. The water passes through the thermostat 22 to a line 24 back to the inlet 16 of the engine 10, while the temperature is above 170° F., but below 180° F. When the water reaches a predetermined higher temperature such as 180° F., for example, the thermostat valve 22 blocks the water in the second loop and directs it to a third loop. In effect, the system thus far is aimed at keeping the heat exchanger 20 at 180° F. after its initial warm up period. When this temperature is exceeded, the third loop provides greater cooling for the engine 10.

When the water temperature exceeds 180° F., the thermostat 22 prevents water from flowing in the second loop including the line 24 and forces the water through the third loop which includes the roof cooling radiator 26. The cooled water from the roof radiator 26 is circulated through the third loop which also includes an expansion tank 28 and line 30 which leads back to the inlet 16 of the engine 10. The dotted line 32 represents means for bleeding air from the various lines. As is known, when an engine is started, air is often trapped in the engine or pumped into the coolant which must be exhausted in order for the pumps in the system and coolant to work properly. The third loop including the line 30 is primarily to prevent overheating of the engine and provides extra cooling when the temperature goes over 180° F. The overall purpose of the system thus far described is to maintain the temperature at the heat exchanger 20 at 180° F.

The system illustrated to the right of the heat exchanger 20 to be described constitutes the heating arrangement system for heating the interior of the car or other compartment and is not interconnected with the system just described.

A water circulating pump 34 is connected to pump water in the line through one of two paths. The first path is from the pump 34 around the heat exchanger 20, through a check valve 36, through line 38, lines 39 and 41, through radiators or heating coils 40 and 42, through which air is forced by fans or other means not illustrated, and back to the pump 34.

The second path is from the pump 34 through a valve 44, heat exchanger 20, through line 38, lines 39 and 41, radiators or heating coils 40 and 42 and back to the pump 34.

In considering the operation of the system, the pump 34 will go on or off dependent upon the heating or air conditioning requirements in a car. A thermocouple means or thermistor 35 may be disposed in an overhead duct of the system. The pump 34 will operate only when it is desired to heat the car or heat super cooled air during air conditioning by having heated air by the radiators 40 and 42. This is accomplished by circulating hot water therethrough at selected times.

The heating system for the interior of the car is designed to have means, such as a temperature sensing arrangement, including thermistors or the like, disposed in the air ducts associated with radiators 40 and 42. The output signals from the thermocouple arrangement are connected to a control unit, which may include various temperature responsive switches and power to selectively operate the pump 34 and modulator valve 44 when predetermined temperatures are reached.

The thermocouple 35 responds to the temperature within the air ducts (not illustrated). It is noted that this temperature is not the same as the temperature of the hot water in the system. The system is designed to satisfy various different temperature conditions. Most of the components used in the system, such as the thermostat valves, modulator valves, pump, and thermocouples, are conventional and variable to accommodate different conditions.

The thermocouple 35 detects the temperature in the air ducts associated with the radiators and applies a signal to a control unit 37. The control unit includes various temperature responsive switches and power to operate other external devices, such as the pump 34 and a modulator valve 44. The particular circuitry within the control unit 37 may take various forms well known to those skilled in the art. The details relating to the control unit are omitted.

In considering one type of operation when the thermocouple 35 reaches a predetermined temperature, for example, of about 62° F. to 65° F., the control unit responds to close a switch to apply power to drive the pump 34 and to open the modulator valve 44. Water is then circulated from the pump 34 through the valve 44, through the heat exchanger 20 and heating coils 40 and 42. The check valve 36 is a spring loaded valve and is set to have a slightly higher resistance path than the path through the heat exchanger 20 when the valve 44 is open. Consequently water will flow through this path as long as the pump continues to operate with the modulator valve 44 open.

The valve 44 will remain open as long as the temperature is below a predetermined temperature, for example, between 72° F. and 74° F. When the temperature of the duct exceeds about 74° F., the valve 44 closes. When the valve 44 closes, the water from the pump 34 is prevented from passing through the heat exchanger 20, overcomes the spring loading and passes through the valve 36.

The valve 44 may be designed to go off and on periodically and in effect modulates the flow so that it is on some predetermined ratio of the total time, for example, 30% to 70% of the time depending upon air duct temperature. For example, at low temperatures, the valve 44 may remain open longer than at higher temperatures. Thus the valve 44 will close when the duct temperature reaches 72° F., and open when the temperature drops. As mentioned, it may be controlled to open and close at periodic intervals in accordance with the duct temperatures.

Means including thermistors to supply signals to control unit 37 could be included. The thermistors could be used to generate voltage signals representative of temperature levels. Means may also be provided in the control unit 37 to turn the modulator valve 44 on and off every fifteen seconds, for example. The lengths of times for which the modulator valve remains on each time may be dependent upon the temperature levels represented by voltage levels generated by thermistors. The modulator valve may be longer for low temperatures and shorter for high temperatures. Various other means may be also used to control the operation of the modulator valve 44 dependent upon the system design.

While there has been described a heating system with special application in railway cars, when auxiliary power engine units are used, the invention is also applicable in connection with other vehicles, such as buses where engine liquid cooling systems are used. It is also apparent that coolants other than water may be used in the system.

What is claimed is:

1. In combination with an engine which generates heat and a liquid circulating loop including a heat exchanger to provide cooling for said engine,
 a heating system for providing heat for a compartment, comprising:
 (a) heating elements in said compartment to generate heat in response to hot liquid passing therethrough,
 (b) a pump for circulating liquid through said heating elements through a first and second parallel path,
 (c) said heat exchanger being connected in said first parallel path so that liquid circulated therethrough by said pump through said heating elements will receive heat, from said heat exchanger
 (d) said second path by-passing said heat exchanger, and
 (e) switching means including temperature responsive means to selectively switch the liquid from said pump to one of said first and second paths, said switching means further including a first valve positioned in said first parallel path between said pump and said heat exchanger, and said switching means being responsive to a predetermined temperature in said compartment for permitting liquid to flow through said first valve, a second valve positioned in said second parallel path, adjacent said pump and by-passing said heat exchanger and being biased to normally closed position and responsive to liquid pressure for permitting liquid to flow therethrough whenever the temperature in said compartment exceeds a predetermined temperature, said first valve will close and such restricted flow of liquid causing the pressure in said first and second paths to increase thereby causing said second valve to open and permit the liquid to flow through said second path and by-pass said heat exchanger.

2. A heating system as set forth in claim 1 wherein said temperature responsive means includes a temperature sensor means disposed to detect the temperature within a compartment and control means connected to said temperature sensor means.

3. A heating system as set forth in claim 2 wherein said first control valve is responsive to said control means to open when the temperature detected by said temperature sensor means is below a predetermined level and to close when said temperature rises above a predetermined level.

* * * * *